United States Patent
Keledjian et al.

(10) Patent No.: US 9,334,403 B2
(45) Date of Patent: *May 10, 2016

(54) MOISTURE-CURABLE URETHANE-CONTAINING FUEL RESISTANT PREPOLYMERS AND COMPOSITIONS THEREOF

(71) Applicant: PRC-DeSoto International, Inc., Sylmar, CA (US)

(72) Inventors: Raquel Keledjian, Glendale, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 14/200,687

(22) Filed: Mar. 7, 2014

(65) Prior Publication Data

US 2015/0252230 A1    Sep. 10, 2015

(51) Int. Cl.

| C08L 75/04 | (2006.01) |
|---|---|
| C08L 75/08 | (2006.01) |
| C08G 18/10 | (2006.01) |
| C08G 18/38 | (2006.01) |
| C08G 18/52 | (2006.01) |
| C08G 75/04 | (2006.01) |
| C09J 175/08 | (2006.01) |
| C08G 18/75 | (2006.01) |
| C08G 18/28 | (2006.01) |

(52) U.S. Cl.
CPC ............ *C08L 75/04* (2013.01); *C08G 18/10* (2013.01); *C08G 18/289* (2013.01); *C08G 18/3893* (2013.01); *C08G 18/52* (2013.01); *C08G 18/758* (2013.01); *C08G 75/045* (2013.01); *C08L 75/08* (2013.01); *C09J 175/08* (2013.01); *C08G 2190/00* (2013.01)

(58) Field of Classification Search
IPC .................. C08G 18/10,18/52, 18/289, 75/045, C08G 18/3893, 2190/00; C08L 75/04, 75/08
See application file for complete search history.

(56) References Cited

U.S. PATENT DOCUMENTS

| 4,366,307 | A | 12/1982 | Singh et al. |
|---|---|---|---|
| 4,609,762 | A | 9/1986 | Morris et al. |
| 4,623,711 | A | 11/1986 | Morris et al. |
| 5,225,472 | A | 7/1993 | Cameron et al. |
| 6,172,179 | B1 | 1/2001 | Zook et al. |
| 6,509,418 | B1 | 1/2003 | Zook et al. |
| 6,525,168 | B2 | 2/2003 | Zook et al. |
| 7,009,032 | B2 | 3/2006 | Bojkova et al. |
| 2006/0270796 | A1* | 11/2006 | Sawant ............... C08G 75/045 525/126 |
| 2010/0010133 | A1 | 1/2010 | Zook et al. |
| 2010/0041839 | A1 | 2/2010 | Anderson et al. |
| 2011/0009557 | A1 | 1/2011 | Lin |
| 2011/0319559 | A1 | 12/2011 | Kania et al. |
| 2012/0234205 | A1 | 9/2012 | Hobbs et al. |
| 2012/0238707 | A1 | 9/2012 | Hobbs et al. |
| 2013/0071571 | A1 | 3/2013 | Hobbs et al. |
| 2013/0079485 | A1 | 3/2013 | Cai et al. |
| 2013/0296490 | A1 | 11/2013 | Hobbs et al. |
| 2014/0314960 | A1 | 10/2014 | Srivatsan et al. |

OTHER PUBLICATIONS

Martel et al., "Coordination of Al(III) in the environment and in biological systems," Coordination Chemistry Reviews, 1996, vol. 149, p. 311-328.
Yokel, "Aluminum chelation principles and recent advances," Coordination Chemistry Reviews, 2002, vol. 228, p. 97-113.

* cited by examiner

*Primary Examiner* — Rabon Sergent
(74) *Attorney, Agent, or Firm* — William R. Lambert

(57) ABSTRACT

Moisture-curable, urethane-containing prepolymers containing urethanes incorporated into the prepolymer backbone and compositions thereof for use in sealant applications are disclosed. The prepolymers can be prepared by reacting an isocyanate-terminated urethane-containing adduct with a compound comprising a group reactive with an isocyanate group and at least one polyalkoxysilyl group. Compositions containing a moisture-curable, urethane-containing prepolymer and a moisture cure catalyst can be used to provide cured compositions exhibiting improved tensile strength. Compositions containing the prepolymers are useful in aerospace sealant applications.

19 Claims, 1 Drawing Sheet

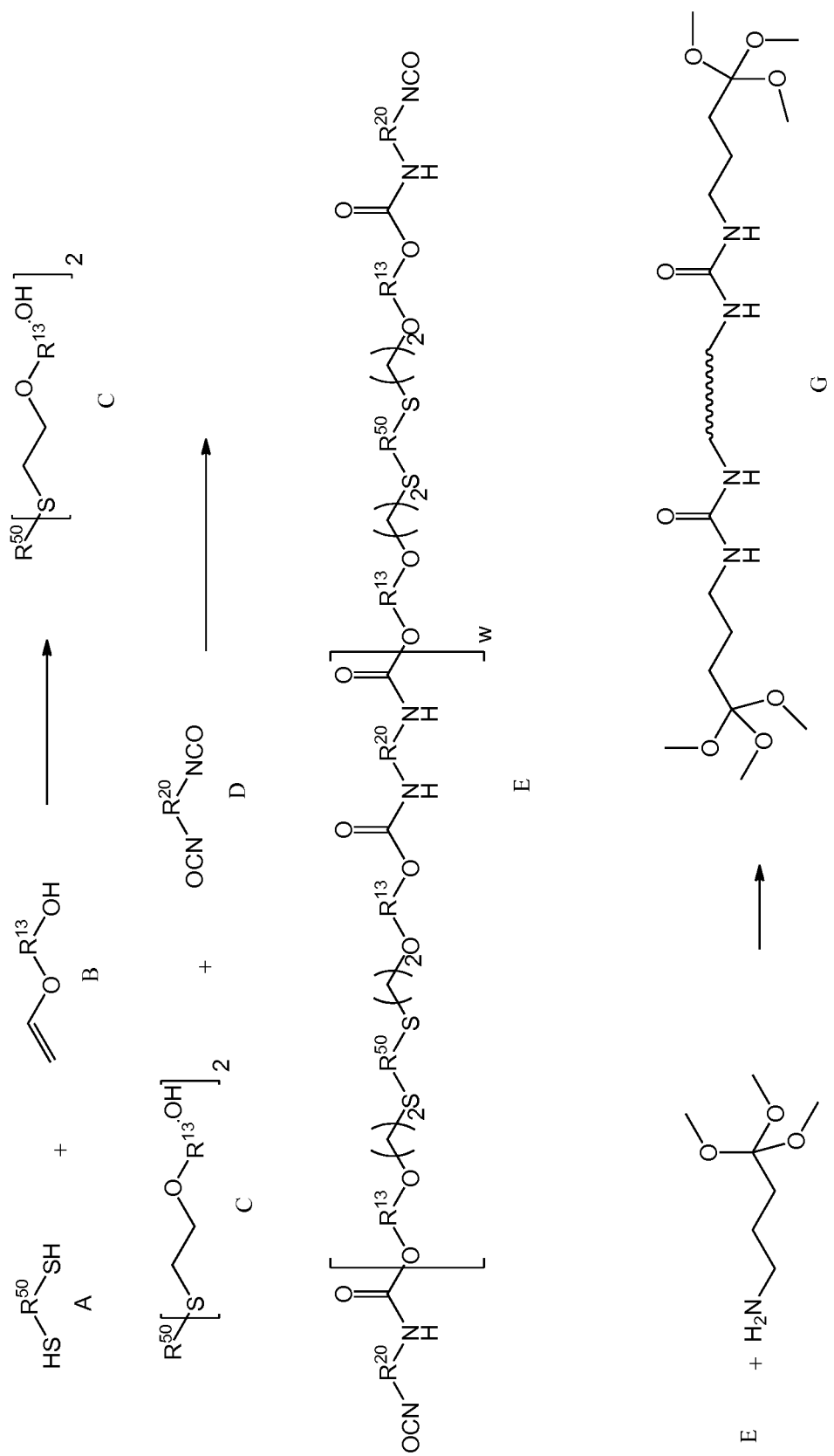

MOISTURE-CURABLE URETHANE-CONTAINING FUEL RESISTANT PREPOLYMERS AND COMPOSITIONS THEREOF

FIELD

The present disclosure relates to moisture-curable urethane-containing prepolymers and compositions thereof for use in aerospace sealant applications. The moisture curable prepolymers provide cured compositions that may exhibit improved tensile strength and/or elongation.

BACKGROUND

Sealants useful in aerospace and other applications must satisfy demanding mechanical, chemical, and environmental requirements. The sealants can be applied to a variety of surfaces including metal surfaces, primer coatings, intermediate coatings, finished coatings, and aged coatings.

SUMMARY

Sealant compositions having improved cured properties moisture curable urethane-containing fuel resistance prepolymers that incorporate urethane segments into the polymer backbone are disclosed.

In a first aspect, moisture-curable urethane-containing prepolymers are provided comprising a reaction product of reactants comprising: (a) an isocyanate-terminated urethane-containing prepolymer comprising the reaction product of reactants comprising a diisocyanate and a hydroxy-terminated sulfur-containing prepolymer comprising the reaction product of reactants comprising a hydroxy vinyl ether and a thiol-terminated sulfur-containing prepolymer; and (b) a compound comprising a group reactive with an isocyanate group; and at least one polyalkoxysilyl group.

In a second aspect, moisture-curable urethane-containing prepolymers are provided comprising a prepolymer of Formula (6a), a prepolymer of Formula (6b), or a combination thereof:

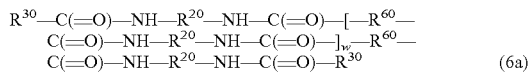

(6a)

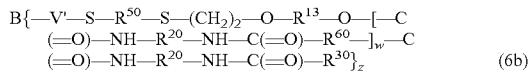

(6b)

wherein,
w is an integer from 1 to 100;
each $R^{13}$ independently comprises $C_{2\text{-}10}$ alkanediyl;
each $R^{20}$ independently comprises a core of a diisocyanate;
each $R^{30}$ independently is a moiety comprising a terminal polyalkoxysilyl group;
each $R^{50}$ independently comprises a core of a sulfur-containing prepolymer;
each $R^{60}$ independently comprises a moiety having the structure of Formula (7):

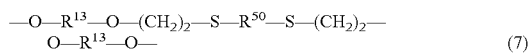

(7)

B represents a core of a z-valent, polyfunctionalizing agent $B(\text{---}V)_z$ wherein,
z is an integer from 3 to 6; and
each V is a moiety comprising a terminal group reactive with a thiol group; and each —V'— is derived from the reaction of —V with a thiol.

In a third aspect, compositions are provided comprising a moisture-curable urethane-containing prepolymer provided by the present disclosure and a moisture cure catalyst.

In a fourth aspect, cured sealants are disclosed comprising a composition provided by the present disclosure.

In a fifth aspect, methods of synthesizing a moisture-curable urethane-containing prepolymer are provided, comprising:

reacting a thiol-terminated sulfur-containing prepolymer with a hydroxy vinyl ether to provide a hydroxy-terminated sulfur-containing adduct;

reacting the hydroxy-terminated sulfur-containing adduct with a diisocyanate to provide an isocyanate-terminated urethane-containing adduct; and reacting the isocyanate-terminated urethane-containing adduct with a compound comprising a group reactive with an isocyanate and at least one terminal polyalkoxysilyl group to provide the moisture-curable urethane-containing prepolymer.

Reference is now made to certain embodiments of compositions and methods. The disclosed embodiments are not intended to be limiting of the claims. To the contrary, the claims are intended to cover all alternatives, modifications, and equivalents.

BRIEF DESCRIPTION OF THE DRAWINGS

FIG. 1 shows a reaction scheme for the preparation of moisture-curable urethane-containing prepolymers according to certain embodiments of the present disclosure.

DETAILED DESCRIPTION

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

A dash ("-") that is not between two letters or symbols is used to indicate a point of covalent bonding for a substituent or between two atoms. For example, the chemical group —CONH$_2$ is covalently bonded to another chemical moiety through the carbon atom. In certain instances, the expression "-*" is used to denote the point of bonding.

"Alkanearene" refers to a hydrocarbon group having one or more aryl and/or arenediyl groups and one or more alkyl and/or alkanediyl groups, where aryl, arenediyl, alkyl, and alkanediyl are defined herein. In certain embodiments, each aryl and/or arenediyl group(s) is $C_{6-12}$, $C_{6-10}$, and in certain embodiments, phenyl or benzene-diyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanearene group is $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, and in certain embodiments, $C_{6-9}$ alkanearene. Examples of alkanearene groups include diphenyl methane.

"Alkanearenediyl" refers to a diradical of an alkanearene group. In certain embodiments, the alkanearenediyl group is $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, and in certain embodiments, $C_{6-9}$ alkanearenediyl. Examples of alkanearenediyl groups include diphenyl methane-4,4'-diyl.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methanediyl (—CH$_2$—), ethane-1,2-diyl (—CH$_2$CH$_2$—), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$—), hexane-1,6-diyl (—CH$_2$CH$_2$CH$_2$CH$_2$CH$_2$CH$_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkenyl" refers to a group having the structure —CR=CR$_2$ where the alkenyl group is a terminal group and is bonded to a larger molecule. In such embodiments, each R may be selected from, for example, hydrogen and $C_{1-3}$ alkyl. In certain embodiments, each R is hydrogen and an alkenyl group has the structure —CH=CH$_2$.

"Alkoxy" refers to a —OR group where R is alkyl as defined herein. Examples of alkoxy groups include methoxy, ethoxy, n-propoxy, isopropoxy, and n-butoxy. In certain embodiments, the alkoxy group is $C_{1-8}$ alkoxy, $C_{1-6}$ alkoxy, $C_{1-4}$ alkoxy, and in certain embodiments, $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. In certain embodiments, the alkyl group is $C_{1-6}$ alkyl, $C_{1-4}$ alkyl, and in certain embodiments, $C_{1-3}$ alkyl. Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{1-6}$ alkyl, $C_{1-4}$ alkyl, and in certain embodiments, $C_{1-3}$ alkyl. It will be appreciated that a branched alkyl has at least three carbon atoms.

"Aminosilane" refers to a polyalkoxysilane comprising an amine group.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$ cycloalkanediyl, $C_{3-6}$ cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

"Cycloalkyl" refers to a saturated monocyclic or polycyclic hydrocarbon monoradical group. In certain embodiments, the cycloalkyl group is $C_{3-12}$ cycloalkyl, $C_{3-8}$ cycloalkyl, $C_{3-6}$ cycloalkyl, and in certain embodiments, $C_{5-6}$ cycloalkyl.

"Heteroalkanediyl" refers to an alkanediyl group in which one or more of the carbon atoms are replaced with a heteroatom, such as N, O, S, or P. In certain embodiments of heteroalkanediyl, a heteroatom is selected from N and O.

"Heteroalkanearenediyl" refers to an alkanearenediyl group in which one or more of the carbon atoms are replaced with a heteroatom, such as N, O, S, or P. In certain embodiments of heteroalkanearenediyl, the heteroatom is selected from N and O.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

"Derived from" refers to a functional group or moiety following reaction with another reactive functional group or moiety. For example, the moiety —CH$_2$—CH$_2$—S— can be derived from the reaction of an alkenyl group, —CH=CH$_2$ with a thiol group —SH. Similarly, the moiety —S— can be derived from the reaction of —SH with a group that is reactive with thiol groups. In certain embodiments, a group —R'— is derived from the reaction of the group —R with a reactive group. In certain embodiments, a moiety —R' is derived from the reaction of a compound R with a reactive group.

Core of a sulfur-containing prepolymer or adduct refers to the moiety forming the sulfur-containing prepolymer or adduct without the terminal functional groups. For example, the core of sulfur-containing prepolymer or adduct having the structure R$^f$—R—R$^f$ where each R$^f$ represents a moiety comprising a terminal functional group, is —R—.

Core of a diisocyanate refers to the moiety forming the diisocyanate without the isocyanate groups. For example, the core of a diisocyanate having the structure O=C=N—R—N=C=O is represented by —R—.

"Moisture curable" prepolymers refer to prepolymers that are curable in the presence of atmospheric moisture. Moisture curable prepolymers provided by the present disclosure are terminated in two or more polyalkoxysilyl groups. In certain embodiments, an end of a moisture curable prepolymer may be terminated with one polyalkoxysilyl group, two polyalkoxysilyl groups, or three polyalkoxysilyl groups. Thus, a linear moisture-curable prepolymer may comprise from two to six polyalkoxysilyl groups. A linear moisture-curable prepolymer may comprise a mixture of moisture-curable prepolymers having different numbers of polyalkoxysilyl groups and therefore may be characterized by an average non-integer polyalkoxysilyl functionality from two to six. In certain embodiments, the backbone of a moisture curable prepolymer is polyfunctional having, for example from three to six arms. Each of the arms may be terminated in from one to three polyalkoxysilyl groups. Thus, in certain embodiments, moisture-curable prepolymers having a multi-dentate backbone may have, for example, from three to 18 polyalkoxysilyl groups. Linear and multi-dentate moisture-curable prepolymers having different numbers of polyalkoxysilyl groups may be combined in different ratios to provide moisture-curable prepolymers characterized by a wide range of polyalkoxysilyl functionality.

As used herein, "polymer" refers to oligomers, homopolymers, and copolymers, which may be cured or uncured. Unless stated otherwise, molecular weights are number average molecular weights for polymeric materials indicated as "$M_n$," as determined, for example, by gel permeation chromatography using a polystyrene standard in an art-recognized manner. Unless stated otherwise, molecular weights are number average molecular weights for polymeric materials indicated as "Mn" as may be determined, for example, by gel permeation chromatography using a polystyrene standard in an art-recognized manner.

"Prepolymers" refer to polymers prior to curing. In general, prepolymers provided by the present disclosure are liquid at room temperature. "Adducts" refer to prepolymers that are functionalized with a reactive terminal group; however, prepolymers may also contain terminal functional group. Thus, the terms prepolymer and adduct are used interchangeably. The term adduct is often used to refer to a prepolymer that is an intermediate in a reaction sequence used to prepare a prepolymer.

"Polythioether" refers to a compound containing at least two thioether linkages, that is "—CR$_2$—S—CR$_2$—" groups. In addition to at least two thioether groups, polythioethers provided by the present disclosure may comprise at least two formal, acetal, and/or ketal groups, e.g., at least two —O—CR$_2$—O— groups, where each R is independently selected from hydrogen, C$_{1-6}$ alkyl, C$_{7-12}$ phenylalkyl, substituted C$_{7-12}$ phenylalkyl, C$_{6-12}$ cycloalkylalkyl, substituted C$_{6-12}$ cycloalkylalkyl, C$_{3-12}$ cycloalkyl, substituted C$_{3-12}$ cycloalkyl, C$_{6-12}$ aryl, and substituted C$_{6-12}$ aryl. In certain embodiments, such compounds are prepolymers or adducts.

Suitable polythioethers are disclosed, for example, in U.S. Pat. No. 6,172,179, which is incorporated by reference in its entirety.

A "polyalkoxysilyl group" refers to a group having the structure of Formula (5):

$$—Si(—R^7)_p(—OR^7)_{3-p} \quad (5)$$

where p is selected from 0, 1, and 2; and each R$^7$ is independently selected from C$_{1-4}$ alkyl. In certain embodiments of a polyalkoxysilyl group, p is 0, p is 1, and in certain embodiments, p is 2. In certain embodiments of a polyalkoxysilyl group, each R$^7$ is independently selected from ethyl and methyl. In certain embodiments of a polyalkoxysilyl group, each R$^7$ is ethyl, and in certain embodiments, each R$^7$ is methyl. In certain embodiments of a polyalkoxysilyl group, the group is selected from —Si(—OCH$_2$CH$_3$)$_3$, —Si(—OCH$_3$)$_3$, —Si(—CH$_3$)(—OCH$_3$)$_2$, —Si(—CH$_3$)$_2$(—OCH$_3$), —Si(—CH$_3$)(—OCH$_2$CH$_3$)$_2$, —Si(—CH$_3$)$_2$(—OCH$_2$CH$_3$), —Si(—CH$_2$CH$_3$)(—OCH$_3$)$_2$, and —Si(—CH$_2$CH$_3$)$_2$(—OCH$_3$).

A "polyalkoxysilane" refers to a compound comprising a polyalkoxysilyl group. Polyalkoxysilyl groups are adhesion promoting groups and therefore polyalkoxysilanes are adhesion promoters. In certain embodiments, a polyalkoxysilane has the formula R$^{11}$—P—R$^{12}$ where P is the core of the polyalkoxysilane, R$^{11}$ comprises a polyalkoxysilyl group, and R$^{12}$ comprises a reactive functional group.

"Substituted" refers to a group in which one or more hydrogen atoms are each independently replaced with the same or different substituent(s). In certain embodiments, a substituent is selected from halogen, —S(O)$_2$OH, —S(O)$_2$, —SH, —SR where R is C$_{1-6}$ alkyl, —COOH, —NO$_2$, —NR$_2$ where each R is independently selected from hydrogen and C$_{1-3}$ alkyl, —CN, —C=O, C$_{1-6}$ alkyl, —CF$_3$, —OH, phenyl, C$_{2-6}$ heteroalkyl, C$_{5-6}$ heteroaryl, C$_{1-6}$ alkoxy, and —COR where R is C$_{1-6}$ alkyl. In certain embodiments, a substituent is chosen from —OH, —NH$_2$, and C$_{1-3}$ alkyl.

Reference is now made to certain embodiments of metal ligand-containing prepolymers such as metal ligand-containing polythioethers, compositions thereof, and methods of synthesis. The disclosed embodiments are not intended to be limiting of the claims. To the contrary, the claims are intended to cover all alternatives, modifications, and equivalents.

To enhance the tensile strength moisture-curable urethane-containing prepolymers comprising urethane segments incorporated into the backbone of sulfur-containing prepolymers are disclosed.

Moisture-curable prepolymers provided by the present disclosure represent an improvement over previously disclosed moisture-curable urethane-containing prepolymers such as those disclosed in U.S. Application entitled "Michael Acceptor-Terminated Urethane-Containing Fuel Resistant Prepolymers and Compositions Thereof" by Keledjian and Lin, filed concurrently with the present application, which is incorporated by reference in its entirety. Cured sealants prepared from moisture-curable urethane-prepolymers provided by the present disclosure exhibit enhanced tensile strength and elongation compared to moisture-curable urethane-containing prepolymers disclosed in these applications. The enhanced tensile strength is believed to be imparted by the incorporation of urethane segments into the polymer backbone.

Moisture curable urethane-containing prepolymers comprise a urethane-containing prepolymer capped with polyalkoxysilyl groups.

In certain embodiments, a moisture-curable urethane-containing prepolymer comprises a moisture-curable urethane-containing prepolymer of Formula (6a), a moisture-curable urethane-containing prepolymer of Formula (6b), or a combination thereof:

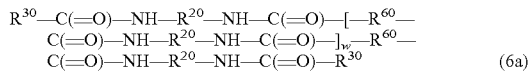  (6a)

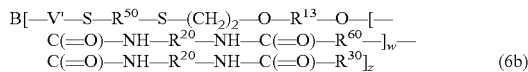  (6b)

wherein,
w is an integer from 1 to 100;
each $R^{13}$ independently comprises $C_{2-10}$ alkanediyl;
each $R^{20}$ independently comprises a core of a diisocyanate;
each $R^{30}$ independently is a moiety comprising at least one terminal polyalkoxysilyl group;
each $R^{50}$ independently comprises a core of a sulfur-containing prepolymer;
each $R^{60}$ independently comprises a moiety having the structure of Formula (7):

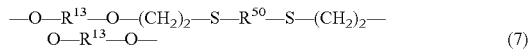  (7)

B represents a core of a z-valent, polyfunctionalizing agent B(—V)$_z$ wherein,
z is an integer from 3 to 6; and
each V is a moiety comprising a terminal group reactive with a thiol group; and
each —V'— is derived from the reaction of —V with a thiol.

In certain embodiments of Formula (6a) and Formula (6b), w is an integer from 1 to 50, from 1 to 25, from 5 to 100, from 5 to 50, from 10 to 100, or from 10 to 50.

In certain embodiments of Formula (6a) and Formula (6b), each $R^{13}$ is independently ethane-diyl, n-propane-diyl, n-butane-diyl, n-pentane-diyl, or n-hexane-diyl. In certain embodiments of Formula (6a) and Formula (6b), each $R^{13}$ is independently $C_{2-6}$ alkanediyl, $C_{2-4}$ alkanediyl, and in certain embodiments, $C_{3-6}$ alkanediyl.

In certain embodiments of Formula (6a) and Formula (6b), each $R^{20}$ is independently derived from a diisocyanate selected from a cycloaliphatic diisocyanate such as, for example, 4,4'-methylenedicyclohexyl diisocyanate.

In certain embodiments of Formula (6a) and Formula (6b), each $R^{30}$ comprises a terminal polyalkoxysilyl group having the structure of Formula (5):

  (5)

where p is selected from 0, 1, and 2; and each $R^7$ is independently selected from $C_{1-4}$ alkyl.

In certain embodiments of Formula (6a) and Formula (6b), each $R^{30}$ independently comprises a moiety having the structure of Formula (8a), Formula (8b), or a combination thereof:

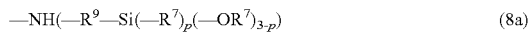  (8a)

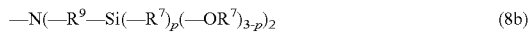  (8b)

where p is selected from 0, 1, and 2; each $R^7$ is independently selected from $C_{1-4}$ alkyl; and each $R^9$ is independently $C_{1-10}$ alkanediyl. In certain embodiments of Formula (8a) and (8b), each $R^9$ is $C_{1-6}$ alkanediyl, $C_{1-4}$ alkanediyl, $C_{2-6}$ alkanediyl, ethane-diyl, n-propane-diyl, n-butane-diyl, n-pentane-diyl, and in certain embodiments, n-hexane-diyl.

In certain embodiments of Formula (6a) and (6b), each $R^{30}$ has the structure of Formula (8c):

  (8c)

In certain embodiments of Formula (6a) and Formula (6b), each $R^{30}$ independently is derived from an aminosilane.

In certain embodiments of Formula (6a) and Formula (6b), each $R^{50}$ comprises a core of a thiol-terminated sulfur-containing prepolymer such as, for example, a thiol-terminated polythioether, a thiol-terminated polysulfide, a thiol-terminated sulfur-containing polyformal, or a combination of any of the foregoing.

In certain embodiments, each $R^{50}$ is derived from a polythioether prepolymer and has the structure of Formula (9):

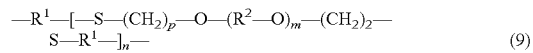  (9)

wherein,
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and —[(—CHR$^3$—)$_s$—X—]$_q$—(—CHR$^3$—)$_r$—, wherein,
s is an integer from 2 to 6;
q is an integer from 1 to 5;
r is an integer from 2 to 10;
each $R^3$ is independently selected from hydrogen and methyl; and
each X is independently selected from —O—, —S—, and —NR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and —[(—CHR$^3$—)$_s$—X—]$_q$—(—CHR$^3$—)$_r$—, wherein s, q, r, $R^3$, and X are as defined as for $R^1$;
m is an integer from 0 to 50;
n is an integer from 1 to 60; and
p is an integer from 2 to 6.

In certain embodiments, the isocyanate content of a moisture-curable urethane-containing prepolymer is from 1% to 10%, from 2% to 6%, and in certain embodiments, from 3% to 5%.

It can be appreciated that moisture-curable urethane-containing prepolymers provided by the present disclosure may be synthesized by a number of routes. The functional groups of the precursors can be adapted and selected for a particular reaction chemistry. For example, in certain embodiments, it can be convenient that the sulfur-containing prepolymer comprise thiol or hydroxy functional groups. In embodiments in which the sulfur-containing prepolymer has functional hydroxy groups, a diisocyanate may be directly reacted with the sulfur-containing prepolymer. In embodiments in which the precursor sulfur-containing prepolymer is thiol-terminated, the thiol groups may be capped with a hydroxy functional compound to provide a hydroxy-terminated sulfur-containing adduct that may then be reacted with a diisocyanate. The diisocyanate-terminated adduct may then be reacted with a compound comprising a group reactive with an isocyanate group, and a terminal polyalkoxysilyl group.

In certain embodiments, a moisture-curable urethane-containing prepolymer is derived from the reaction of a thiol-terminated sulfur-containing prepolymer, a hydroxy vinyl ether, a diisocyanate, and an aminosilane, and optionally a polyfunctionalizing agent.

In certain embodiments, moisture-curable urethane-containing prepolymers provided by the present disclosure comprise the reaction product of reactants comprising an isocyanate-terminated urethane-containing adduct, and an aminosilane. In certain embodiments, moisture-curable urethane-containing prepolymers provided by the present disclosure comprise the reaction product of reactants comprising an isocyanate-terminated urethane-containing adduct, and a compound comprising a group reactive with an isocyanate and at least one polyalkoxysilyl group.

A general reaction sequence according to certain embodiments is summarized in FIG. 1. As shown in FIG. 1, a sulfur-containing polythiol (A) such as a sulfur-containing dithiol, a sulfur-containing trithiol, or combination thereof, can be reacted with a hydroxy vinyl ether (B) to provide a hydroxy-terminated sulfur-containing adduct (C). The hydroxy-terminated sulfur-containing adduct (C) can then be reacted with a diisocyanate (D) to provide an isocyanate-terminated urethane-containing adduct (E) in which urethane segments are incorporated into the backbone of the sulfur-containing prepolymer. The isocyanate-terminated urethane-containing adduct (E) is the reacted with a compound (F) comprising a group reactive with an isocyanate group and at least one polyalkoxysilyl group such as an aminosilane to form a moisture-curable urethane-containing prepolymer (G).

Sulfur-containing prepolymers useful in preparing moisture-curable urethane-containing prepolymers include polythioethers, polysulfides, sulfur-containing polyformals and combinations of any of the foregoing. In certain embodiments, a sulfur-containing prepolymer may be difunctional, and in certain embodiments, may have a functionality greater than 2 such as 3, 4, 5, or 6. A sulfur-containing prepolymer may comprise a mixture of sulfur-containing prepolymers having different functionalities characterized by an average functionality from 2.05 to 6, from 2.1 to 4, from 2.1 to 3, from 2.2 to 2.8, and in certain embodiments, from 2.4 to 2.6.

Examples of suitable polythioethers are disclosed, for example, in U.S. Pat. No. 6,172,179.

In certain embodiments, a sulfur-containing prepolymer comprises a polythioether comprising a backbone comprising the structure of Formula (9):

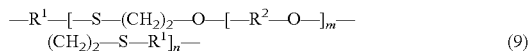

(9)

wherein:
each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a —[(—$CHR^3$—)$_p$—X—]$_q$—(CHR$^3$)$_r$— group, wherein each $R^3$ is selected from hydrogen and methyl;
each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a —[(—$CH_2$—)$_p$—X—]$_q$—(CH$_2$)$_r$— group;
each X is independently selected from O, S, and a —NR— group, in which R is selected from hydrogen and a methyl group;
m ranges from 0 to 50;
n is an integer ranging from 1 to 60;
p is an integer ranging from 2 to 6;
q is an integer ranging from 1 to 5; and
r is an integer ranging from 2 to 10.

In certain embodiments of a compound of Formula (9), $R^1$ is —[—(CHR$^3$)$_s$—X—]$_q$—(CHR$^3$)$_r$— wherein each X is independently selected from —O— and —S—. In certain embodiments wherein $R^1$ is —[—(CHR$^3$)$_s$—X—]$_q$—(CHR$^3$)$_r$—, each X is —O— and in certain embodiments, each X is —S—.

In certain embodiments of a compound of Formula (9), $R^1$ is —[—(CH$_2$)$_s$—X—]$_q$—(CH$_2$)$_r$— wherein each X is independently selected from —O— and —S—. In certain embodiments wherein $R^1$ is —[—(CH$_2$)$_s$—X—]$_q$—(CH$_2$)$_r$—, each X is —O— and in certain embodiments, each X is —S—.

In certain embodiments, $R^1$ in Formula (9) is —[(—CH$_2$—)$_p$—X—]$_q$—(CH$_2$)$_r$—, where p is 2, X is O, q is 2, r is 2, $R^2$ is ethanediyl, m is 2, and n is 9.

In certain embodiments of Formula (9), each $R^1$ is derived from dimercaptodioxaoctane (DMDO) and in certain embodiments, each $R^1$ is derived from dimercaptodiethylsulfide (DMDS).

In certain embodiments of Formula (9), each m is independently an integer from 1 to 3. In certain embodiments, each m is the same and is 1, 2, and in certain embodiments, 3.

In certain embodiments of Formula (9), n is an integer from 1 to 30, an integer from 1 to 20, an integer from 1 to 10, and in certain embodiments, and an integer from 1 to 5. In addition, in certain embodiments, n may be any integer from 1 to 60.

In certain embodiments of Formula (9), each p is independently selected from 2, 3, 4, 5, and 6. In certain embodiments, each p is the same and is 2, 3, 4, 5, or 6.

In certain embodiments, a sulfur-containing prepolymer can be a polysulfide. Polysulfides refer to prepolymers that contain one or more sulfide linkages, i.e., —S$_x$— linkages, where x is from 2 to 4, in the polymer backbone and/or in pendant positions on the polymer chain. In certain embodiments, the polysulfide polymer will have two or more sulfur-sulfur linkages. Suitable polysulfides are commercially available, for example, from Akzo Nobel and Toray Fine Chemicals under the names Thiokol-LP and Thioplast®. Thioplast® products are available in a wide range of molecular weights ranging, for example, from less than 1,100 to over 8,000, with molecular weight being the average molecular weight in grams per mole. In some cases, the polysulfide has a number average molecular weight of 1,000 Daltons to 4,000 Daltons. Examples of suitable polysulfides are disclosed, for example, in U.S. Pat. No. 4,623,711.

Sulfur-containing polyformal prepolymers useful in aerospace sealant applications are disclosed, for example, in U.S. Application Publication No. 2012/0234205 and in U.S. Application Publication No. 2012/0238707, each of which is incorporated by reference in its entirety.

In certain embodiments, a sulfur-containing prepolymer comprises a metal ligand-containing sulfur-containing prepolymer in which a metal ligand is incorporated into the backbone of the prepolymer. Metal-ligand containing sulfur-containing prepolymers are disclosed in U.S. application Ser. No. 14/065,554 filed on Oct. 29, 2013, which is incorporated by reference in its entirety.

In certain embodiments, a sulfur-containing prepolymer may be difunctional, and in certain embodiments, may have a functionality greater than 2 such as 3, 4, 5, or 6. A sulfur-containing prepolymer may comprise a mixture of sulfur-containing prepolymer having different functionalities characterized by an average functionality from 2.05 to 6, from 2.1 to 4, from 2.1 to 3, from 2.2 to 2.8, and in certain embodiments, from 2.4 to 2.6.

In certain embodiments, a sulfur-containing prepolymer comprises urethane segments incorporated into the backbone of the prepolymer. Urethane-containing prepolymers are disclosed in U.S.

Application entitled "Michael Acceptor-Terminated Urethane-Containing Fuel Resistant Prepolymers and Compositions Thereof" by Keledjian and Lin.

In certain embodiments, a thiol-terminated sulfur-containing prepolymer comprises a thiol-terminated polythioether, a thiol-terminated polysulfide, a thiol-terminated sulfur-containing polyformal, or a combination of any of the foregoing.

In certain embodiments, thiol-terminated sulfur-containing prepolymer comprises a thiol-terminated polythioether. Examples of thiol-functional polythioethers are disclosed, for example, in U.S. Pat. No. 6,172,179. In certain embodiments, a thiol-functional polythioether comprises Permapol® P3.1E, available from PRC-DeSoto International Inc., Sylmar, Calif.

In certain embodiments, a thiol-terminated sulfur-containing prepolymer comprises a thiol-terminated polythioether selected from a thiol-terminated polythioether of Formula (10a), a thiol-terminated polythioether of Formula (10b), and a combination thereof:

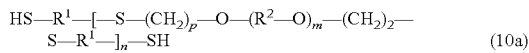

$$HS-R^1-[-S-(CH_2)_p-O-(R^2-O)_m-(CH_2)_2-S-R^1-]_n-SH \qquad (10a)$$

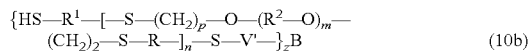

$$\{HS-R^1-[-S-(CH_2)_p-O-(R^2-O)_m-(CH_2)_2-S-R-]_n-S-V'-\}_zB \qquad (10b)$$

wherein:
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(-CHR^3-)_s-X-]_q-(-CHR^3-)_r-$, wherein:
s is an integer from 2 to 6;
q is an integer from 1 to 5;
r is an integer from 2 to 10;
each $R^3$ is independently selected from hydrogen and methyl; and
each X is independently selected from $-O-$, $-S-$, and $-NR-$, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $-[(-CHR^3-)_s-X-]_q-(-CHR^3-)_r-$, wherein s, q, r, $R^3$, and X are as defined as for $R^1$;
m is an integer from 0 to 50;
n is an integer from 1 to 60;
p is an integer from 2 to 6;
B represents a core of a z-valent, vinyl-terminated polyfunctionalizing agent $B(-V)_z$ wherein:
z is an integer from 3 to 6; and
each V is a group comprising a terminal vinyl group; and each $-V'-$ is derived from the reaction of $-V$ with a thiol.

In certain embodiments, Formula (10a) and in Formula (10b), $R^1$ is $-[(-CH_2-)_p-X-]_q(CH_2)_r-$, where p is 2, X is $-O-$, q is 2, r is 2, $R^2$ is ethanediyl, m is 2, and n is 9.

In certain embodiments of Formula (10a) and Formula (10b), $R^1$ is selected from $C_{2-6}$ alkanediyl and $-[-(CHR^3)_s-X-]_q-(CHR^3)_r-$.

In certain embodiments of Formula (10a) and Formula (10b), $R^1$ is $-[-(CHR^3)_s-X-]_q(CHR^3)_r-$, and in certain embodiments X is $-O-$ and in certain embodiments, X is $-S-$.

In certain embodiments of Formula (10a) and Formula (10b), where $R^1$ is $-[-(CHR^3)_s-X-]_q-(CHR^3)_r-$, p is 2, r is 2, q is 1, and X is $-S-$; in certain embodiments, wherein p is 2, q is 2, r is 2, and X is $-O-$; and in certain embodiments, p is 2, r is 2, q is 1, and X is $-O-$.

In certain embodiments of Formula (10a) and Formula (10b), where $R^1$ is $-[-(CHR^3)_s-X-]_q-(CHR^3)_r-$, each $R^3$ is hydrogen, and in certain embodiments, at least one $R^3$ is methyl.

In certain embodiments of Formula (10a) and Formula (10b), each $R^1$ is the same, and in certain embodiments, at least one $R^1$ is different.

Various methods can be used to prepare thiol-terminated polythioethers of Formula (10a) and Formula (10b). Examples of suitable thiol-terminated polythioethers, and methods for their production, are described in U.S. Pat. No. 6,172,179 at col. 2, line 29 to col. 4, line 22; col. 6, line 39 to col. 10, line 50; and col. 11, lines 65 to col. 12, line 22, the cited portions of which are incorporated by reference. Such thiol-terminated polythioethers may be difunctional, that is, linear polymers having two terminal thiol groups, or polyfunctional, that is, branched polymers have three or more terminal thiol groups. Suitable thiol-terminated polythioethers are commercially available, for example, as Permapol® P3.1E, from PRC-DeSoto International Inc., Sylmar, Calif.

In certain embodiments, a thiol-terminated sulfur-containing prepolymer comprises a polythioether. A sulfur-containing prepolymer may comprise a mixture of different polythioethers and the polythioethers may have the same or different functionality. In certain embodiments, a sulfur-containing prepolymer has an average functionality from 2 to 6, from 2 to 4, from 2 to 3, and in certain embodiments, from 2.05 to 2.5. For example, a sulfur-containing prepolymer can be selected from a difunctional sulfur-containing polymer, a trifunctional sulfur-containing prepolymer, and a combination thereof.

In certain embodiments, a thiol-terminated polythioether can be prepared by reacting a polythiol and a diene such as a divinyl ether, and the respective amounts of the reactants used to prepare the polythioethers are chosen to yield terminal thiol groups. Thus, in some cases, (n or >n, such as n+1) moles of a polythiol, such as a dithiol or a mixture of at least two different dithiols and about 0.05 moles to 1 moles, such as 0.1 moles to 0.8 moles, of a thiol-terminated polyfunctionalizing agent may be reacted with (n) moles of a diene, such as a divinyl ether, or a mixture of at least two different dienes, such as a divinyl ether. In certain embodiments, a thiol-terminated polyfunctionalizing agent is present in the reaction mixture in an amount sufficient to provide a thiol-terminated polythioether having an average functionality of from 2.05 to 3, such as 2.1 to 2.8.

The reaction used to make a thiol-terminated polythioether may be catalyzed by a free radical catalyst. Suitable free radical catalysts include azo compounds, for example azobisnitrile compounds such as azo(bis)isobutyronitrile (AIBN); organic peroxides, such as benzoyl peroxide and t-butyl peroxide; and inorganic peroxides, such as hydrogen peroxide. The reaction can also be effected by irradiation with ultraviolet light either with or without a radical initiator/photosensitizer. Ionic catalysis methods, using either inorganic or organic bases, e.g., triethylamine, may also be used.

Suitable thiol-terminated polythioethers may be produced by reacting a divinyl ether or mixtures of divinyl ethers with an excess of dithiol or a mixtures of dithiols.

Thus, in certain embodiments, a thiol-terminated polythioether comprises the reaction product of reactants comprising:
(a) a dithiol of Formula (11):

$$HS-R^1-SH \qquad (11)$$

wherein:
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_s-X-]_q-(CHR^3)_r-$;
wherein:
each $R^3$ is independently selected from hydrogen and methyl;
each X is independently selected from $-O-$, $-S-$, $-NH-$, and $-NR-$ wherein R is selected from hydrogen and methyl;
s is an integer from 2 to 6;

q is an integer from 1 to 5; and
r is an integer from 2 to 10; and
(b) a divinyl ether of Formula (12):

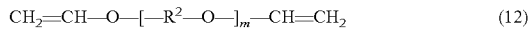

wherein:
each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined above;
m is an integer from 0 to 50;
n is an integer from 1 to 60; and
p is an integer from 2 to 6.

And, in certain embodiments, the reactants may comprise (c) a polyfunctional compound such as a polyfunctional compound $B(—V)_z$, where B, —V, and z are as defined herein.

In certain embodiments, dithiols suitable for use in preparing thiol-terminated polythioethers include those having Formula (11), other dithiols disclosed herein, or combinations of any of the dithiols disclosed herein. In certain embodiments, a dithiol has the structure of Formula (11):

$$HS—R^1—SH \qquad (11)$$

wherein:
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $—[—(CHR^3)_s—X—]_q—(CHR^3)_r—$;
wherein:
each $R^3$ is independently selected from hydrogen and methyl;
each X is independently selected from —O—, —S—, and —NR— wherein R is selected from hydrogen and methyl;
s is an integer from 2 to 6;
q is an integer from 1 to 5; and
r is an integer from 2 to 10.

In certain embodiments of a dithiol of Formula (11), $R^1$ is $—[—(CHR^3)_s—X—]_q—(CHR^3)_r—$.

In certain embodiments of a compound of Formula (11), X is selected from —O— and —S—, and thus $—[—(CHR^3)_s—X—]_q—(CHR^3)_r—$ in Formula (11) is $—[(—CHR^3—)_s—O—]_q—(CHR^3)_r—$ or $—[(—CHR^3_2—)_s—S—]_q—(CHR^3)_r—$. In certain embodiments, p and r are equal, such as where p and r are both two.

In certain embodiments of a dithiol of Formula (11), $R^1$ is selected from $C_{2-6}$ alkanediyl and $—[—(CHR^3)_s—X—]_q—(CHR^3)_r—$.

In certain embodiments of a dithiol of Formula (11), $R^1$ is $—[—(CHR^3)_s—X—]_q—(CHR^3)_r—$, and in certain embodiments X is —O—, and in certain embodiments, X is —S—.

In certain embodiments where $R^1$ is $—[—(CHR^3)_s—X—]_q—(CHR^3)_r—$, s is 2, r is 2, q is 1, and X is —S—; in certain embodiments, wherein s is 2, q is 2, r is 2, and X is —O—; and in certain embodiments, s is 2, r is 2, q is 1, and X is —O—.

In certain embodiments where $R^1$ is $—[—(CHR^3)_s—X—]_q—(CHR^3)_r—$, each $R^3$ is hydrogen, and in certain embodiments, at least one $R^3$ is methyl.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., $C_{1-6}$) alkyl group, a lower alkoxy group, and a hydroxyl group. Suitable alkyl pendant groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (11), $R^1$ is $—[(—CH_2—)_s—X—]_q—(CH_2)_r—$, wherein s is 2, r is 2, q is 1, and X is —S—); dimercaptodioxaoctane (DMDO) (in Formula (11), $R^1$ is $—[(—CH_2—)_s—X—]_q—(CH_2)_r—$, wherein s is 2, q is 2, r is 2, and X is —O—); and 1,5-dimercapto-3-oxapentane (in Formula (11), $R^1$ is $—[(—CH_2—)_s—X—]_q—(CH_2)_r—$, wherein s is 2, r is 2, q is 1, and X is —O—). It is also possible to use dithiols that include both heteroatoms in the carbon backbone and pendant alkyl groups, such as methyl groups. Such compounds include, for example, methyl-substituted DMDS, such as $HS—CH_2CH(—CH_3)—S—CH_2CH_2—SH$, $HS—CH(—CH_3)CH_2—S—CH_2CH_2—SH$ and dimethyl substituted DMDS, such as $HS—CH_2CH(—CH_3)—S—CH(—CH_3)CH_2—SH$ and $HS—CH(—CH_3)CH_2—S—CH_2CH(—CH_3)—SH$.

Suitable divinyl ethers for preparing polythioethers include, for example, divinyl ethers of Formula (12):

where $R^2$ in Formula (12) is selected from a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and $—[(—CH_2—)_s—O—]—(—CH_2—)_r—$, where s is an integer ranging from 2 to 6, q is an integer from 1 to 5, and r is an integer from 2 to 10. In certain embodiments of a divinyl ether of Formula (12), $R^2$ is a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and in certain embodiments, $—[(—CH_2—)_s—O—]_q—(—CH_2—)_r—$.

Suitable divinyl ethers include, for example, compounds having at least one oxyalkanediyl group, such as from 1 to 4 oxyalkanediyl groups, i.e., compounds in which m in Formula (12) is an integer ranging from 1 to 4. In certain embodiments, m in Formula (12) is an integer ranging from 2 to 4. It is also possible to employ commercially available divinyl ether mixtures that are characterized by a non-integral average value for the number of oxyalkanediyl units per molecule. Thus, m in Formula (12) can also take on rational number values ranging from 0 to 10.0, such as from 1.0 to 10.0, from 1.0 to 4.0, or from 2.0 to 4.0.

Examples of suitable vinyl ethers include, divinyl ether, ethylene glycol divinyl ether (EG-DVE) ($R^2$ in Formula (12) is ethanediyl and m is 1), butanediol divinyl ether (BD-DVE) ($R^2$ in Formula (12) is butanediyl and m is 1), hexanediol divinyl ether (HD-DVE) ($R^2$ in Formula (12) is hexanediyl and m is 1), diethylene glycol divinyl ether (DEG-DVE) ($R^2$ in Formula (12) is ethanediyl and m is 2), triethylene glycol divinyl ether ($R^2$ in Formula (12) is ethanediyl and m is 3), tetraethylene glycol divinyl ether ($R^2$ in Formula (12) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxyl groups, alkoxy groups, and amine groups.

In certain embodiments, divinyl ethers in which $R^2$ in Formula (12) is $C_{3-6}$ branched alkanediyl may be prepared by reacting a polyhydroxy compound with acetylene. Examples of divinyl ethers of this type include compounds in which $R^2$ in Formula (12) is an alkyl-substituted methanediyl group such as —CH(—CH$_3$)—, for which R$^2$ in Formula (12) is ethanediyl and m is 3.8) or an alkyl-substituted ethanediyl.

Other useful divinyl ethers include compounds in which R$^2$ in Formula (12) is polytetrahydrofuryl (poly-THF) or polyoxyalkanediyl, such as those having an average of about 3 monomer units.

Two or more types of polyvinyl ether monomers of Formula (12) may be used. Thus, in certain embodiments, two dithiols of Formula (11) and one polyvinyl ether monomer of Formula (12), one dithiol of Formula (11) and two polyvinyl ether monomers of Formula (12), two dithiols of Formula (11) and two divinyl ether monomers of Formula (12), and more than two compounds of one or both Formula (11) and Formula (12), may be used to produce a variety of thiol-terminated polythioethers.

In certain embodiments, a polyvinyl ether monomer comprises 20 to less than 50 mole percent of the reactants used to prepare a thiol-terminated polythioether, and in certain embodiments, 30 to less than 50 mole percent.

In certain embodiments provided by the present disclosure, relative amounts of dithiols and divinyl ethers are selected to yield polythioethers having terminal thiol groups. Thus, a dithiol of Formula (11) or a mixture of at least two different dithiols of Formula (11), are reacted with of a divinyl ether of Formula (12) or a mixture of at least two different divinyl ethers of Formula (12) in relative amounts such that the molar ratio of thiol groups to vinyl groups is greater than 1:1, such as 1.1 to 2.0:1.0.

The reaction between dithiols and divinyl ethers and/or polythiols and polyvinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. In certain embodiments, the catalyst does not comprise acidic or basic compounds, and does not produce acidic or basic compounds upon decomposition. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts are alkyl peroxides, such as t-butyl peroxide. The reaction may also be effected by irradiation with ultraviolet light either with or without a cationic photoinitiating moiety.

Thiol-terminated polythioethers provided by the present disclosure may be prepared by combining at least one compound of Formula (11) and at least one compound of Formula (12) followed by addition of an appropriate catalyst, and carrying out the reaction at a temperature from 30° C. to 120° C., such as 70° C. to 90° C., for a time from 2 to 24 hours, such as 2 to 6 hours.

As disclosed herein, thiol-terminated polythioethers may comprise a polyfunctional polythioether, i.e., may have an average functionality of greater than 2.0. Suitable polyfunctional thiol-terminated polythioethers include, for example, those having the structure of Formula (10b):

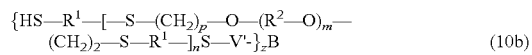

wherein z has an average value of greater than 2.0, and, in certain embodiments, a value between 2 and 3, a value between 2 and 4, a value between 3 and 6, and in certain embodiments, is an integer from 3 to 6.

Polyfunctionalizing agents suitable for use in preparing such polyfunctional thiol-terminated polymers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed in U.S. Publication No. 2010/0010133 at paragraphs [0102]-[0105], the cited portion of which is incorporated by reference and isocyanurates as disclosed, for example, in U.S. Application Publication No. 2011/0319559, which is incorporated by reference. Other useful polyfunctionalizing agents include trimethylolpropane trivinyl ether, and the polythiols described in U.S. Pat. Nos. 4,366,307; 4,609,762; and 5,225,472, each of which is incorporated by reference. Mixtures of polyfunctionalizing agents may also be used. As a result, bis(sulfonyl)alkanol-containing polythioethers provided by the present disclosure may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

In certain embodiments, a hydroxy-terminated sulfur-containing adduct may be formed by reacting a thiol-terminated sulfur-containing prepolymer with a hydroxy vinyl ether.

In certain embodiments, hydroxy vinyl ethers can be used to functionalize a thiol-terminated sulfur-containing prepolymer with a group reactive with an isocyanate group. In certain embodiments, a hydroxy-functional vinyl ether has the structure of Formula (13):

where t is an integer from 2 to 10. In certain embodiments, t is 1, 2, 3, 4, 5, and in certain embodiments, t is 6.

Examples of suitable hydroxy-functional vinyl ethers useful for reacting with thiol-terminated sulfur-containing prepolymers include 1,4-cyclohexane dimethylol monovinyl ether, 1-methyl-3-hydroxypropyl vinyl ether, 4-hydroxybutyl vinyl ether, and a combination of any of the foregoing. In certain embodiments, a hydroxy-functional vinyl ether is 4-hydroxybutyl vinyl ether.

In certain embodiments, hydroxy-terminated sulfur-containing adducts provided by the present disclosure comprise terminal hydroxy groups that are reactive with isocyanate groups and may be reacted directly with a polyisocyanate such as a diisocyanate to provide isocyanate-terminated urethane-containing adducts useful in forming moisture-curable prepolymers provided by the present disclosure.

In certain embodiments, a sulfur-containing prepolymer may be functionalized to provide groups sufficiently reactive with isocyanate groups. For example, in certain embodiments, thiol-terminated sulfur-containing prepolymer provide suitable precursors to form moisture-curable prepolymers of the present disclosure. To render a thiol-terminated sulfur-containing prepolymer reactive with isocyanate groups the thiol-terminated sulfur-containing prepolymer may be functionalized with hydroxy groups. In certain embodiments, a thiol-terminated sulfur-containing prepolymer can be reacted with a compound having a group reactive with an alkenyl group and a hydroxy group to provide a hydroxy-terminated sulfur-containing adduct. Examples of such compounds include hydroxy vinyl ethers.

In certain embodiments, a hydroxy-terminated sulfur-containing adduct comprises a hydroxy-terminated polythioether adduct, such as a hydroxy-terminated polythioether adduct of Formula (14a), a hydroxy-terminated polythioether adduct of Formula (14b), or a combination thereof.

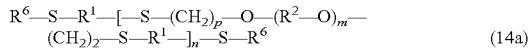

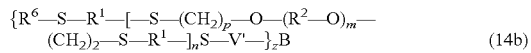

where $R^1$, $R^2$, m, n, and p are defined herein, and each $R^6$ is a moiety comprising a terminal hydroxy group.

In certain embodiments, each $R^6$ is derived from a hydroxy vinyl ether and has the structure of Formula (15):

where $R^{13}$ is $C_{2-10}$ alkanediyl. In certain embodiments, $R^{13}$ is $—(CH_2)_4—$.

In certain embodiments, a hydroxy-terminated sulfur-containing adduct comprises the reaction product of a difunctional thiol-terminated polythioether, a trifunctional thiol-terminated polythioether, or a combination thereof; and a hydroxy vinyl ether. In certain embodiments, a hydroxy-terminated sulfur-containing adduct comprises the reaction product of Permapol® 3.1E and a hydroxyvinyl ether, such as butyl vinyl ether.

In certain embodiments, an isocyanate-terminated urethane-containing adduct comprises an isocyanate-terminated urethane-containing polythioether adduct, an isocyanate-terminated urethane-containing polysulfide adduct, an isocyanate-terminated urethane-containing sulfur-containing polyformal adduct, or a combination of any of the foregoing.

Isocyanate-terminated urethane-containing adducts may comprise the reaction product of reactants comprising a hydroxy-terminated sulfur-containing adduct and a diisocyanate. In certain embodiments the ratio of hydroxy-terminated sulfur-containing adduct and diisocyanate is selected such that the diisocyanate is incorporated into the backbone of the sulfur-containing prepolymer and terminates the prepolymer. In certain embodiments, the isocyanate content of an isocyanate-terminated urethane-containing prepolymer is from 1% to 10%, from 2% to 6%, and in certain embodiments, from 3% to 5%.

Isocyanate-terminated urethane-containing adducts can be prepared by reacting a polyisocyanate with a sulfur-containing adduct comprising terminal groups reactive with isocyanate groups such as terminal hydroxy groups. A polyisocyanate can be difunctional, n-functional where n is an integer from 3 to 6, or a combination of any of the foregoing. In certain embodiments, a polyisocyanate is difunctional and is referred to as a diisocyanate. A diisocyanate may be aliphatic, alicyclic or aromatic.

Examples of suitable aliphatic diisocyanates include, 1,6-hexamethylene diisocyanate, 1,5-diisocyanato-2-methylpentane, methyl-2,6-diisocyanatohexanoate, bis(isocyanatomethyl)cyclohexane, 1,3-bis(isocyanatomethyl)cyclohexane, 2,2,4-trimethylhexane 1,6-diisocyanate, 2,4,4-trimethylhexane 1,6-diisocyanate, 2,5(6)-bis(isocyanatomethyl)cyclo[2.2.1.]heptane, 1,3,3-trimethyl-1-(isocyanatomethyl)-5-isocyanatocyclohexane, 1,8-diisocyanato-2,4-dimethyloctane, octahydro-4,7-methano-1H-indenedimethyl diisocyanate, and 1,1'-methylenebis(4-isocyanatocyclohexane), and 4,4-methylene dicyclohexyl diisocyanate) (H12MDI). Examples of suitable aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanatonaphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl)methyl]-3-isocyanato-2-methyl benzene, and 2,4,6-triisopropyl-m-phenylene diisocyanate.

Examples of suitable alicyclic diisocyanates from which the diisocyanates may be selected include isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, and 2-isocyanatomethyl-2-(3-isocyanatopropyl)-6-(2-isocyanatoethyl)-bicyclo[2.2.1]-heptane.

Examples of suitable aromatic diisocyanates in which the isocyanate groups are not bonded directly to the aromatic ring include, but are not limited to, bis(isocyanatoethyl)benzene, a, a, α',α'-tetramethylxylene diisocyanate, 1,3-bis(1-isocyanato-1-methylethyl)benzene, bis(isocyanatobutyl)benzene, bis(isocyanatomethyl)naphthalene, bis(isocyanatomethyl)diphenyl ether, bis(isocyanatoethyl)phthalate, and 2,5-di(isocyanatomethyl)furan. Aromatic diisocyanates having isocyanate groups bonded directly to the aromatic ring include phenylene diisocyanate, ethylphenylene diisocyanate, isopropylphenylene diisocyanate, dimethylphenylene diisocyanate, diethylphenylene diisocyanate, diisopropylphenylene diisocyanate, naphthalene diisocyanate, methylnaphthalene diisocyanate, biphenyl diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate, dichlorocarbazole diisocyanate, 4,4'-diphenylmethane diisocyanate, p-phenylene diisocyanate, 2,4-toluene diisocyanate, and 2,6-toluene diisocyanate.

Other examples of suitable diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanato naphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, 2,4,6-triisopropyl-m-phenylene diisocyanate, 4,4-methylene dicyclohexyl diisocyanate (H12MDI), and a combination of any of the foregoing.

Additional examples of suitable aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanato naphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, and 2,4,6-triisopropyl-m-phenylene diisocyanate.

Isocyanate-terminated urethane-containing adducts may be prepared, for example, by reacting a hydroxy-terminated sulfur-containing adduct, such as the hydroxy-terminated polythioethers of Formula (14a) and Formula (14b) with a compound having a terminal isocyanate group and a group that is reactive with the terminal hydroxy groups of the polythioethers of Formula (14a) and Formula (14b), such as a diisocyanate.

In certain embodiments, isocyanate-terminated urethane-containing polythioether adducts may be prepared, for example, by reacting a hydroxy-terminated polythioether adduct of Formula (12a) or Formula (12b) with a diisocyanate such as TDI, Isonate™ 143 µL (polycarbodiimide-modified diphenylmethene diisocyanate), Desmodur® N3400 (1,3-diazetidine-2,4-dione, 1,3-bis(6-isocyanatohexyl)-), IDPI (isophorone diisocyanate), or Desmodur® W ($H_{12}$MDI) optionally in the presence of a catalyst such as dibutyltin dilaurate at a temperature from about 70° C. to about 80° C. to provide the corresponding isocyanate-terminated urethane-containing polythioether adduct of Formula (18a), (18b), (19a), and (19b).

In certain embodiments, the moiety $—C(=O)—NH—R^{20}—NH—C(=O)—$ can be derived from a diisocyanate of Formula (16):

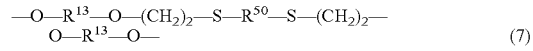

In certain embodiments, $R^{20}$ is a core of an aliphatic diisocyanate such as 4,4'-methylene dicyclohexyl diisocyanate and has the structure of Formula (17):

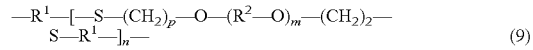

In certain embodiments, a diisocyanate comprises a cycloaliphatic diisocyanate such as, for example, 4,4'-methylene dicyclohexyl diisocyanate.

In certain embodiments, an isocyanate-terminated urethane-containing prepolymer comprises a an isocyanate-terminated urethane-containing prepolymer of Formula (18a), an isocyanate-terminated urethane-containing prepolymer of Formula (18b), or a combination thereof:

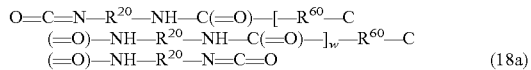

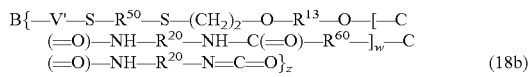

wherein,
w is an integer from 1 to 100;
each $R^{13}$ independently comprises $C_{2-10}$ alkanediyl;
each $R^{20}$ independently comprises a core of a diisocyanate;
each $R^{50}$ independently comprises a core of a sulfur-containing prepolymer;
each $R^{60}$ independently comprises a moiety having the structure of Formula (7):

B represents a core of a z-valent, polyfunctionalizing agent $B(—V)_z$ wherein,
z is an integer from 3 to 6; and
each V is a moiety comprising a terminal group reactive with a thiol group; and
each —V'— is derived from the reaction of —V with a thiol.

In certain embodiments, each $R^{50}$ is derived from a polythioether. For example, in certain embodiments, each $R^{50}$ has the structure of Formula (9):

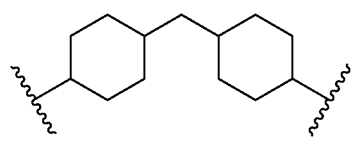

wherein,
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(—CHR^3—)_s—X—]_q—(—CHR^3—)_r—$, wherein:
s is an integer from 2 to 6;
q is an integer from 1 to 5;
r is an integer from 2 to 10;
each $R^3$ is independently selected from hydrogen and methyl; and
each X is independently selected from $—O—$, $—S—$, and $—NR—$, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined as for $R^1$;
m is an integer from 0 to 50;
n is an integer from 1 to 60;
p is an integer from 2 to 6.

In certain embodiments of Formula (18a) and (18b), w is an integer from 2 to 50, and in certain embodiments from 2 to 20.

In certain embodiments, an isocyanate-terminated urethane-containing adduct comprises the reaction product of reactants comprising a hydroxy-terminated sulfur-containing adduct and a diisocyanate.

In certain embodiments, an isocyanate-terminated urethane-containing adduct comprises the reaction product of reactants comprising hydroxy-terminated Permapol® 3.1E and a diisocyanate such as a cycloaliphatic diisocyanate.

Isocyanate-terminated urethane-containing adducts may be synthesized by reacting, for example, a diisocyanate with an appropriately terminated sulfur-containing adduct such as, for example, a hydroxy-terminated sulfur-containing adduct, at a suitable temperature such as from 50° C. to 100° C. for a suitable time such as from 1 hour to 4 hours, in the presence of a tin catalyst, such as dibutyltin dilaurate. Those skilled in the art can determine appropriate reaction conditions.

In certain embodiments, a moisture-curable urethane-containing prepolymer comprises the reaction product of reactants comprising an isocyanate-terminated urethane-containing prepolymer and a compound containing a group reactive with an isocyanate group and at least one polyalkoxysilyl group. In certain embodiments, the compound comprises one polyalkoxysilyl group, two polyalkoxysilyl groups, and in certain embodiments, three polyalkoxysilyl groups.

Groups reactive with isocyanate groups include hydroxyl groups, amine groups, and thiol groups.

Polyalkoxysilyl groups include groups having the structure of Formula (5):

where $R^7$ and p are defined herein.

In certain embodiments, a compound having groups reactive with isocyanate groups and having polyalkoxysilyl groups comprises an aminosilane.

In certain embodiments, a compound having at least one terminal polyalkoxysilyl group can have the structure of Formula (19a) or the structure of Formula (19b):

$$NH_2(-R^9-Si(-R^7)_p(-OR^7)_{3-p}) \quad (19a)$$

$$NH(-R^9-Si(-R^7)_p(-OR^7)_{3-p})_2 \quad (19b)$$

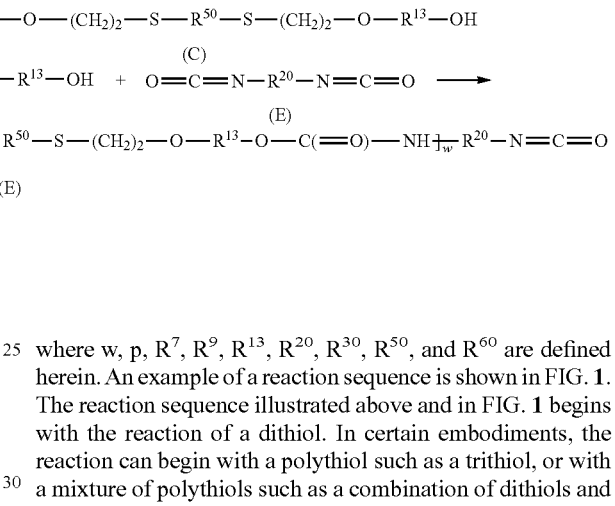

where p and $R^7$ are defined herein, and each $R^9$ is independently selected from $C_{2-6}$ alkanediyl. In certain embodiments, the compound has the structure of Formula (8c):

$$NH_2-(CH_2)_3-Si(-OCH_3)_3 \quad (19c)$$

In certain embodiments, an isocyanate-terminated urethane-containing adduct can be reacted with a compound having a terminal primary amine group and a polyalkoxysilyl group. Examples of such compounds include [3-(2-aminoethylamino)propyl]trimethoxysilane, 3-aminopropyl(diethoxy)methylsilane, (3-aminopropyl)triethoxysilane, (3-aminopropyl)trimethoxysilane In certain embodiments, an isocyanate-terminated urethane-containing adduct is reacted with a compounds having a secondary amine and two polyalkoxysilyl groups. Examples of such compounds include bis[3-(trimethoxysilyl)propyl]amine, bis[3-(triethoxysilyl)propyl]amine, N-beta-(aminoethyl)-gamma-aminopropyltrimethoxysilane, delta-aminohexyl trimethoxysilane, delta-aminohexyl methyldimethoxysilane.

In certain embodiments, an isocyanate-terminated urethane-containing adduct can be reacted with at least one compound having a terminal primary amine group and a polyalkoxysilyl group and/or at least one compound having a primary amine group and two polyalkoxysilyl groups.

In certain embodiments, moisture-curable prepolymers can be prepared in a three-step reaction. The reaction sequence involves providing an isocyanate-terminated urethane-containing prepolymer followed by capping the terminal isocyanate groups with polyalkoxysilyl groups. One skilled in the art will appreciate that other chemistries can be employed to synthesize the disclosed prepolymers. Thus, synthetic methods, precursors and intermediates as appropriate provided that the moisture-curable prepolymer comprise a sulfur-containing backbone capped with a silane.

In a first step, a thiol-terminated sulfur-containing prepolymer can be reacted with an ethylenically unsaturated alcohol such as a hydroxy vinyl ether to provide a hydroxy-terminated sulfur-containing adduct. The reaction can be performed at elevated temperature in the presence of a free-radical catalyst.

In a second step, the hydroxy-terminated sulfur-containing adduct can be reacted with a polyisocyanate to provide an isocyanate-terminated urethane-containing adduct. The reaction can be performed at elevated temperature in the presence of a tin catalyst.

In a third step, the isocyanate-terminated urethane-containing adduct can be reacted with a silane to provide a polyalkoxysilyl-terminated prepolymer of the present disclosure. The reaction can be performed at room temperature.

An example of a suitable reaction sequence is provided as follows:

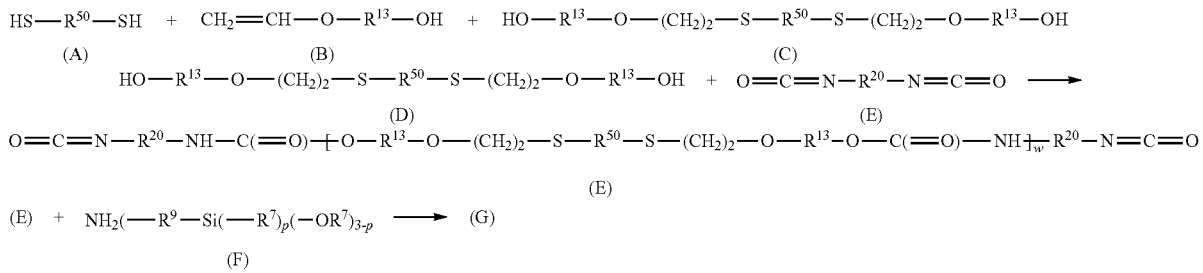

where w, p, $R^7$, $R^9$, $R^{13}$, $R^{20}$, $R^{30}$, $R^{50}$, and $R^{60}$ are defined herein. An example of a reaction sequence is shown in FIG. 1. The reaction sequence illustrated above and in FIG. 1 begins with the reaction of a dithiol. In certain embodiments, the reaction can begin with a polythiol such as a trithiol, or with a mixture of polythiols such as a combination of dithiols and trithiols.

Moisture-curable prepolymers provided by the present disclosure may be used in compositions. In certain embodiments, a composition may be formulated as a sealant, such as an aerospace sealant. Compositions may further include additives, catalysts, fillers, and/or other sulfur-containing prepolymers including for example, polythioethers, polyformals, and/or polysulfides.

Compositions provided by the present disclosure are moisture-curable. It can be appreciated that because the curing agent for polyalkoxysilyl-terminated prepolymer can be atmospheric moisture, it is not necessary to include a curing agent to a curable composition containing a polyalkoxysilyl-terminated prepolymer. Therefore, compositions comprising polyalkoxysilyl-terminated prepolymers provided by the present disclosure and a curing agent for the polyalkoxysilyl group refer to atmospheric moisture.

Polyalkoxysilyl-terminated prepolymers provided by the present disclosure can hydrolyze in the presence of water inducing self-polymerization via condensation. Catalysts for use with polyalkoxysilyl-terminated prepolymers include organotitanium compounds such as tetraisopropoxy titanium, tetra-tert-butoxy titanium, titanium di(isopropoxy)bis(ethylacetoacetate), and titanium di(isopropoxy)bis(acetylacetoacetate); organic tin compounds dibutyltin dilaurate, dibutyltin bisacetylacetoacetate, and tin octylate; metal dicarboxylates such as lead dioctylate; organozirconium compounds such as zirconium tetraacetyl acetonate; and organoaluminum compounds such as aluminum triacetyl-acetonate. Other examples of suitable catalysts for moisture curing include diisopropoxy bis(ethyl acetoacetate)titanium, diisopropoxy bis(acetyl acetonate)titanium, and dibutoxy bis(methyl acetoacetate)titanium.

In certain embodiments, compositions provided by the present disclosure comprise, in addition to a moisture-curable urethane-containing prepolymer one or more additional polyalkoxysilyl-terminated sulfur-containing adducts. A polyalkoxysilyl-terminated sulfur-containing adduct can be any polymer having at least one sulfur atom in the repeating unit, including, but not limited to, polymeric thiols, polythiols, thioethers, polythioethers, sulfur-containing polyformals, and polysulfides. A polyalkoxysilyl-terminated sulfur-containing adduct can be prepared by reacting an appropriately functionalized sulfur-containing prepolymer with an appropriately functionalized silane. Polyalkoxysilyl-terminated sulfur-containing adducts differ from the moisture-curable prepolymers provided by the present disclosure in not incorporating a diisocyanate.

Examples of additional sulfur-containing prepolymers useful in compositions provided by the present disclosure include, for example, those disclosed in U.S. Pat. Nos. 6,172,179, 6,509,418, and 7,009,032. In certain embodiments, compositions provided by the present disclosure comprise a polythioether having the structure of Formula (9):

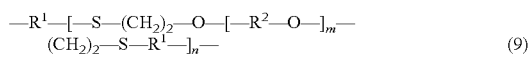
(9)

wherein $R^1$ is selected from a $C_{2-6}$ alkanediyl, $C_{6-8}$ cycloalkanediyl, $C_{6-10}$ cycloalkanealkanediyl, —[(—CH$_2$—)$_s$—X—]$_q$—(—CH$_2$—)$_r$—, and —[(—CH$_2$—)$_s$—X—]$_q$—(—CH$_2$—)$_r$— in which at least one —CH$_2$— unit is substituted with a methyl group; $R^2$ is selected from $C_{2-6}$ alkanediyl, $C_{6-8}$ cycloalkanediyl, $C_{6-10}$ cycloalkanealkanediyl, and —[(—CH$_2$—)$_s$—X—]$_q$—(—CH$_2$—)$_r$—; X is selected from O, S, and —NR$^5$—, where $R^5$ is selected from hydrogen and methyl; m is an integer from 0 to 10; n is an integer from 1 to 60; p is an integer from 2 to 6; q is an integer from 1 to 5, and r is an integer from 2 to 10. Such polythioethers are described in U.S. Pat. No. 6,172,179 at col. 2, line 29 to col. 4, line 34.

The one or more additional sulfur-containing prepolymers may be difunctional or multifunctional, for example, having from 3 to 6 terminal groups, or a mixture thereof.

In certain embodiments, compositions provided by the present disclosure comprise from about 10 wt % to about 90 wt % of a sulfur-containing prepolymer provided by the present disclosure, from about 20 wt % to about 80 wt %, from about 30 wt % to about 70 wt %, and in certain embodiments from about 40 wt % to about 60 wt %, where wt % is based on the total weight of all non-volatile components of the composition (i.e., the dry weight).

As used herein, the term polysulfide refers to a polymer that contains one or more sulfide linkages, i.e., —S$_x$— linkages, where x is from 2 to 4, in the polymer backbone and/or in pendant positions on the polymer chain. In certain embodiments, the polysulfide polymer will have two or more sulfur-sulfur linkages. Suitable polysulfides are commercially available, for example, from Akzo Nobel and Toray Fine Chemicals under the names Thiokol-LP and Thioplast®. Thioplast® products are available in a wide range of molecular weights ranging, for example, from less than 1,100 to over 8,000, with molecular weight being the average molecular weight in grams per mole. In some cases, the polysulfide has a number average molecular weight of 1,000 Daltons to 4,000 Daltons. The crosslink density of these products also varies, depending on the amount of crosslinking agent used. The —SH content, i.e., thiol or mercaptan content, of these products can also vary. The mercaptan content and molecular weight of the polysulfide can affect the cure speed of the polymer, with cure speed increasing with molecular weight.

Sulfur-containing polyformal prepolymers useful in aerospace sealant applications are disclosed, for example, in U.S. Application Publication No. 2012/0234205 and in U.S. Application Publication No. 2012/0238707.

In certain embodiments, the sulfur-containing prepolymer is selected from a polythioether and a polysulfide, and a combination thereof. In certain embodiments a sulfur-containing polymer comprises a polythioether, and in certain embodiments, a sulfur-containing prepolymer comprises a polysulfide. A sulfur-containing prepolymer may comprise a mixture of different polythioethers and/or polysulfides, and the polythioethers and/or polysulfides may have the same or different functionality. In certain embodiments, a sulfur-containing prepolymer has an average functionality from 2 to 6, from 2 to 4, from 2 to 3, and in certain embodiments, from 2.05 to 2.5. For example, a sulfur-containing prepolymer can be selected from a difunctional sulfur-containing prepolymer, a trifunctional sulfur-containing prepolymer, and a combination thereof.

In certain embodiments, compositions provided by the present disclosure comprise one or more than one adhesion promoters. A one or more additional adhesion promoter may be present in amount from 0.1 wt % to 15 wt % of a composition, less than 5 wt %, less than 2 wt %, and in certain embodiments, less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. Other useful adhesion promoters are known in the art.

In certain embodiments, a composition provided by the present disclosure comprises an ethylenically unsaturated silane, such as, for example, a sulfur-containing ethylenically unsaturated silane, which can improve the adhesion of a cured sealant to a metal substrate. As used herein, the term sulfur-containing ethylenically unsaturated silane refers to a molecular compound that comprises, within the molecule, (i) at least one sulfur (S) atom, (ii) at least one, in some cases at least two, ethylenically unsaturated carbon-carbon bonds, such as a carbon-carbon double bonds (C═C); and (iii) at least one silane group, —Si(—R)$_m$(—OR)$_{3-m}$, where each R is independently selected from hydrogen, alkyl, cycloalkyl, aryl, and others, and m is selected from 0, 1, and 2. Examples of ethylenically unsaturated silanes are disclosed in U.S. Publication No. 2012/0040104, which is incorporated by reference in its entirety.

Compositions provided by the present disclosure may comprise one or more different types of filler. Suitable fillers include those commonly known in the art, including inorganic fillers, such as carbon black and calcium carbonate (CaCO$_3$), silica, polymer powders, and lightweight fillers. Suitable lightweight fillers include, for example, those described in U.S. Pat. No. 6,525,168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

In certain embodiments, compositions provided by the present disclosure include low density filler particles. As used herein, low density, when used with reference to such particles means that the particles have a specific gravity of no more than 0.7, in certain embodiments no more than 0.25, and in certain embodiments, no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 to 100 microns and a specific gravity of 0.25 (Eccospheres®). Other examples include alumina/silica microspheres having particle sizes in the range of 5 to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 μm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). In certain embodiments, compositions provided by the present disclosure include lightweight filler particles comprising an exterior surface coated with a thin coating, such as those described in U.S. Publication No. 2010/0041839 at paragraphs [0016]-[0052], the cited portion of which is incorporated herein by reference.

In certain embodiments, a low density filler comprises less than 2 wt % of a composition, less than 1.5 wt %, less than 1.0 wt %, less than 0.8 wt %, less than 0.75 wt %, less than 0.7 wt % and in certain embodiments, less than 0.5 wt % of a composition, where wt % is based on the total dry solids weight of the composition.

In certain embodiments, compositions provided by the present disclosure comprise at least one filler that is effective in reducing the specific gravity of the composition. In certain embodiments, the specific gravity of a composition is from 0.8 to 1, 0.7 to 0.9, from 0.75 to 0.85, and in certain embodiments, is 0.8. In certain embodiments, the specific gravity of a composition is less than about 0.9, less than about 0.8, less than about 0.75, less than about 0.7, less than about 0.65, less than about 0.6, and in certain embodiments, less than about 0.55.

In certain embodiments, a thiol-terminated polythioether including a combination of thiol-terminated polythioethers comprises from about 50 wt % to about 90 wt % of a composition, from about 60 wt % to about 90 wt %, from about 70 wt % to about 90 wt %, and in certain embodiments, from about 80 wt % to about 90 wt % of the composition, where wt % is based on the total dry solids weight of the composition.

A composition may also include any number of additives as desired. Examples of suitable additives include plasticizers, pigments, surfactants, adhesion promoters, thixotropic agents, fire retardants, masking agents, and combinations of any of the foregoing. When used, the additives may be present in a composition in an amount ranging, for example, from about 0% to 60% by weight. In certain embodiments, additives may be present in a composition in an amount ranging from about 25% to 60% by weight.

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. In certain embodiments, sealant compositions provided by the present disclosure are useful, e.g., as aerospace sealants and as linings for fuel tanks.

In certain embodiments, compositions containing moisture-curable prepolymers are formulated as sealants.

For aerospace sealant applications it is desirable that a sealant meet the requirements of Mil-S-22473E (Sealant Grade C) at a cured thickness of 20 mils, exhibit an elongation greater than 200%, a tensile strength greater than 250 psi, and excellent fuel resistance, and maintain these properties over a wide temperature range from −67° F. to 360° F. In general, the visual appearance of the sealant is not an important attribute. Prior to cure, it is desirable that the mixed components have a useful working time or pot life of at least 24 hours and have a cure time within 24 hours of the pot life. Useful working time or pot life refers to the time the composition remains workable for application at ambient temperatures and exposure to moisture. In certain embodiments, compositions provided by the present disclosure, following exposure to moisture, have a pot life of at least 6 hours, at least 12 hours, at least 18 hours, at least 24 hours, and in certain embodiments, more than 24 hours. In certain embodiments, compositions provided by the present disclosure cure in less than 6 hours after the pot life, in less than 12 hours, in less than 18 hours, in less than 24 hours, in less than 48 hours, and in certain embodiments, in less than 72 hours after useful working time.

In certain embodiments, compositions of the present disclosure have a shelf life of at least 1 month, at least 4 months, at least 6 months, and in certain embodiments, greater than 6 months, when stored under moisture-free conditions.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. In certain embodiments, compositions provided by the present disclosure may be applied to a coating on a substrate, such as a polyurethane coating.

Compositions provided by the present disclosure may be applied directly onto the surface of a substrate or over an underlayer by any suitable coating process known to those of ordinary skill in the art.

Furthermore, methods are provided for sealing an aperture utilizing a composition provided by the present disclosure. These methods comprise, for example, applying a composition provided by the present disclosure to a surface to seal an aperture, and curing the composition. In certain embodiments, a method for sealing an aperture comprises applying a sealant composition provided by the present disclosure to defining surface of an aperture and curing the sealant, to provide a sealed aperture.

In certain embodiments, a composition may be cured under ambient conditions, where ambient conditions refers to a temperature from 20° C. to 25° C., and atmospheric humidity. In certain embodiments, a composition may be cured under conditions encompassing a temperature from a 0° C. to 100° C. and humidity from 0% relative humidity to 100% relative humidity. In certain embodiments, a composition may be cured at a higher temperature such as at least 30° C., at least 40° C., and in certain embodiments, at least 50° C. In certain embodiments, a composition may be cured at room temperature, e.g., 25° C. In certain embodiments, a composition may be cured upon exposure to actinic radiation, such as ultraviolet radiation. As will also be appreciated, the methods may be used to seal apertures on aerospace vehicles including aircraft and aerospace vehicles.

In certain embodiments, the composition achieves a tack-free cure in less than about 2 hours, less than about 4 hours, less than about 6 hours, less than about 8 hours, and in certain embodiments, less than about 10 hours, at a temperature of less than about 200° F.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength develops from 2 days to 3 days, following mixing and application to a surface. In general, full adhesion strength as well as other properties of cured compositions of the present disclosure becomes fully developed within 7 days following mixing and application of a curable composition to a surface.

Cured compositions disclosed herein, such as cured sealants, exhibit properties acceptable for use in aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated herein by reference. It is also desirable that, when cured, compositions of the present disclosure used in aviation and aircraft applications exhibit a percent volume swell not greater than 25% following immersion for one week at 60° C. (140° F.) and ambient pressure in JRF Type I. Other properties, ranges, and/or thresholds may be appropriate for other sealant applications.

In certain embodiments, therefore, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28%±1% by volume; cyclohexane (technical): 34%±1% by volume; isooctane: 38%±1% by volume; and tertiary dibutyl disulfide: 1%±0.005% by volume (see AMS 2629, issued Jul. 1, 1989, §3.1.1 etc., available from SAE (Society of Automotive Engineers)).

In certain embodiments, compositions provided herein provide a cured product, such as a sealant, exhibiting a tensile elongation of at least 100% and a tensile strength of at least 400 psi when measured in accordance with the procedure described in AMS 3279, §3.3.17.1, test procedure AS5127/1, §7.7.

In certain embodiments, compositions provide a cured product, such as a sealant, that exhibits a lap shear strength of greater than 200 psi, such as at least 220 psi, at least 250 psi, and, in some cases, at least 400 psi, when measured according to the procedure described in SAE AS5127/1 paragraph 7.8.

In certain embodiments, a cured sealant comprising a composition provided by the present disclosure meets or exceeds the requirements for aerospace sealants as set forth in AMS 3277.

Apertures, including apertures of aerospace vehicles, sealed with compositions provided by the present disclosure are also disclosed.

In certain embodiments, compositions provided by the present disclosure exhibit a Shore A hardness (following 7-day cure) greater than 10, greater than 20, greater than 30, and in certain embodiments, greater than 40; a tensile strength greater than 10 psi, greater than 100 psi, greater than 200 psi, and in certain embodiments, greater than 500 psi; an elongation greater than 100%, greater than 200%, greater than 500%, and in certain embodiments, greater than 1,000%; and a swell following exposure to JRF Type I (7 days) less than 20%.

In certain embodiments, tensile strength and elongation may be determined according to ASTM 412C.

EXAMPLES

Embodiments provided by the present disclosure are further illustrated by reference to the following examples, which describe the synthesis, properties, and uses of certain prepolymers provided by the present disclosure. It will be apparent to those skilled in the art that many modifications, both to materials, and methods, may be practiced without departing from the scope of the disclosure.

Example 1

Synthesis of Thiol-Terminated Polythioether Adduct

A thiol-terminated polythioether was prepared according to Example 1 of U.S. Pat. No. 6,172,179. In a 2-L flask, 524.8 g (3.32 mol) of diethylene glycol divinyl ether (DEG-DVE) and 706.7 g (3.87 mol) of dimercaptodioxaoctane (DMDO) were mixed with 19.7 g (0.08 mol) of triallylcyanurate (TAC) and heated to 77° C. To the reaction mixture was added 4.6 g (0.024 mol) of an azobisnitrile free radical catalyst (Vazo®-67, 2,2'-azobis(2-methylbutyronitrile)). The reaction proceeded substantially to completion after 2 hours to afford 1,250 g (0.39 mol, yield 100%) of a liquid thiol-terminated polythioether adduct having a $T_g$ of −68° C. and a viscosity of 65 poise. The adduct was faintly yellow and had low odor.

Example 2

Synthesis of $H_{12}$MDI-Terminated Polythioether-Isocyanate Prepolymer

A 1-liter, 4-neck round-bottomed flask was fitted with a mantle, thermocouple, temperature controller, nitrogen line, mechanical stirrer and dropping funnel. The flask was charged with a thiol-terminated polythioether (652.30 g) prepared according to Example 1. The flask was heated to 71° C. under nitrogen and stirred at 300 rpm. A mixture of 4-hydroxybutyl vinyl ether (47.40 g) and Vazo-67 (1.19 g) was added to the flask in 1 hour via a dropping funnel. The reaction mixture was maintained at 71° C. for 41 hours, at which time the reaction was complete. After this, the reaction apparatus was then fitted with a vacuum line and the product heated to 94° C. Heating was continued for 1.3 hours under vacuum. Following vacuum treatment, a pale yellow, viscous polythioether polyol (678.80 g) was obtained. The polythioether polyol had a hydroxyl number of 31.8 and a viscosity of 77 Poise.

The polythioether polyol (300.03 g) was then charged into a 500-mL, 4-neck, round-bottom flask. The flask was equipped with a mantle, thermocouple, temperature controller, an inlet for providing nitrogen positive pressure, and a mechanical stirrer (PTFE paddle and bearing). The polythioether polyol was stirred at ca. 200 rpm and heated to 76.6° C. (170° F.), followed by the addition of Desmodur®-W ($H_{12}$MDI) (82.00 g) and a 0.01% solution of dibutyltin dilaurate dissolved in methyl ethyl ketone (3.90 g). The reaction mixture was maintained at 76.6° C. for 7 h and then cooled to room temperature. A 1% solution of benzyl chloride dissolved in methyl ethyl ketone (3.80 g) was then added to the reaction mixture. The resulting $H_{12}$MDI-terminated polythioether prepolymer had an isocyanate content of 3.9%.

Example 3

Synthesis of Silane-Terminated Polythioether Prepolymer

The isocyanate-terminated urethane-containing prepolymer in Example 2 (20.00 g), 3-aminopropylsilane (3.00 g), and methyldimethoxyvinylsilane (4.50 g) were placed in a 60-g Hauschild cup with lid. The mixture was mixed for 4 min at 2300 rpm with a DAC 600 FVZ Speed Mixer, and was left to sit at room temperature for 1 hour. During this time, the isocyanate functionality of the Example 1 polymer fully reacted with 3-aminopropylsilane, yielding a silane-terminated prepolymer. This was evidenced by the viscosity increase of the mixture. Methyldimethoxyvinylsilane dimethoxy(methyl)(vinyl)silane) did not participate in the reaction.

Example 4

Formulation of Silane-Terminated Polythioether Prepolymer

200 μL of water and 200 μL of dibutyltin dilaurate were added to the mixture in Example 3 and mixed for 30 seconds at 2300 rpm with a DAC 600 FVZ Speed Mixer. The mixture was poured out on a circular, 6-inch in diameter, polycarbonate lid to make tensile and elongation specimens. The specimens were allowed to cure for 3 days, at which time the material was fully cured. The tensile and elongation values were measured according to ASTM 412C. The tensile strength is 451 psi and the elongation is 288%.

Example 5

Synthesis of Silane-Terminated Polythioether Prepolymer

The isocyanate-terminated urethane-containing prepolymer in Example 2 (20.00 g), 3-aminopropylsilane (3.02 g), and methyldimethoxyvinylsilane (4.54 g) were placed in a 60-g Hauschild cup with lid. The mixture was mixed for 4 min at 2300 rpm with a DAC 600 FVZ Speed Mixer, and was left to sit at room temperature for 1 hour. During this time, the isocyanate functionality of the Example 1 polymer fully reacted with 3-aminopropylsilane, yielding a silane-terminated prepolymer. This was evidenced by the viscosity increase of the mixture. Methyldimethoxyvinylsilane dimethoxy(methyl)(vinyl)silane) did not participate in the reaction.

Example 6

Formulation of Silane-Terminated Polythioether Prepolymer

200 μL of water and 200 μL of dibutyltin dilaurate were added to the mixture in Example 5 and mixed for 30 seconds at 2300 rpm with a DAC 600 FVZ Speed Mixer. The mixture was poured out on a circular, 6-inch in diameter, polycarbonate lid to make tensile and elongation specimens. The specimens were allowed to cure for 3 days, at which time the material was fully cured. The tensile and elongation values were measured according to ASTM 412C. The tensile strength is 400 psi and the elongation is 222%.

Example 7

Additional Formulations

Additional formulations were prepared similar to that in Examples 4 and 5 and the tensile strength and elongation of the cured sealants measured. The results are summarized in Table 1 and in Table 2.

TABLE 1

| % NCO | % C | Tensile strength (psi)/Elongation (%) |
|---|---|---|
| 3.8 | 20 | 471/110 |
| 3.8 | 16 | 675/150 |

TABLE 2

| % NCO | % A | % B | % C | Tensile strength (psi)/Elongation (% |
|---|---|---|---|---|
| 3.8 | 0 | 27 | 0 | 666/75 |
| 3.8 | 0 | 11 | 16 | 451/288 |
| 3.8 | 15 | 14 | 0 | 421/44 |

In the tables, % NCO refers to the isocyanate content of the prepolymer, A is 3-aminopropyl)triethoxysilane, B is 3-aminopropyl)(methyl)dimethoxysilane, and C is methoxy(methyl)vinylsilane, where the percent (%) refers to wt % of the total solids weight of the composition.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A moisture-curable urethane-containing prepolymer comprising a reaction product of reactants comprising:
   (a) an isocyanate-terminated urethane-containing adduct comprising the reaction product of reactants comprising:
      (i) a hydroxy-terminated sulfur-containing adduct comprising the reaction product of reactants comprising a hydroxy vinyl ether and a thiol-terminated sulfur-containing prepolymer, wherein the thiol-terminated sulfur-containing prepolymer comprises a thiol-terminated polythioether, a thiol-terminated polysulfide, a thiol-terminated sulfur-containing polyformal, or a combination of any of the foregoing; and
(ii) a diisocyanate; and
(b) a compound comprising:
a group reactive with an isocyanate group; and
at least one polyalkoxysilyl group.

2. The prepolymer of claim 1, wherein the hydroxy-terminated sulfur-containing adduct comprises a hydroxy-terminated polythioether adduct of Formula (14a), a hydroxy-terminated polythioether adduct of Formula (14b), or a combination thereof:

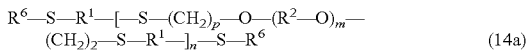  (14a)

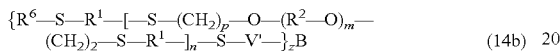  (14b)

wherein,
each $R^1$ independently is selected from $C_{2-10}$ alkanediyl, $C_{6-8}$ cycloalkanediyl, $C_{6-10}$ alkanecycloalkanediyl, $C_{5-8}$ heterocycloalkanediyl, and $—[(—CHR^3—)_s—X—]_q—(—CHR^3—)_r—$, wherein,
s is an integer from 2 to 6;
q is an integer from 1 to 5;
r is an integer from 2 to 10;
each $R^3$ is independently selected from hydrogen and methyl; and
each X is independently selected from —O—, —S—, and —NR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined for $R^1$;
m is an integer from 0 to 50;
n is an integer from 1 to 60; and
p is an integer from 2 to 6;
each $R^6$ is independently selected from $—CH_2—CH_2—O—R^{13}—OH$, wherein each $R^{13}$ is $C_{2-10}$ alkanediyl; and
B represents a core of a z-valent, polyfunctionalizing agent $B(—V)_z$ wherein,
z is an integer from 3 to 6; and
each V is a moiety comprising a terminal group reactive with a thiol group; and
each —V'— is derived from the reaction of —V with a thiol.

3. The prepolymer of claim 1, wherein the thiol-terminated sulfur-containing prepolymer comprises a thiol-terminated polythioether prepolymer of Formula (10a), a thiol-terminated polythioether prepolymer of Formula (10b), or a combination thereof:

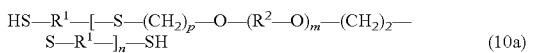  (10a)

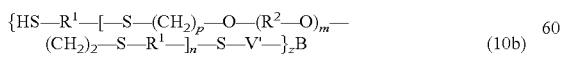  (10b)

wherein:
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(—CHR^3—)_s—X—]_q—(—CHR^3—)_r—$, wherein:
s is an integer from 2 to 6;
q is an integer from 1 to 5;
r is an integer from 2 to 10;
each $R^3$ is independently selected from hydrogen and methyl; and
each X is independently selected from —O—, —S—, and —NR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined as for $R^1$;
m is an integer from 0 to 50;
n is an integer from 1 to 60;
p is an integer from 2 to 6;
B represents a core of a z-valent, polyfunctionalizing agent $B(—V)_z$ wherein:
z is an integer from 3 to 6; and
each V is a group comprising a terminal group reactive with a thiol group; and
each —V'— is derived from the reaction of —V with a thiol.

4. The prepolymer of claim 1, wherein the isocyanate-terminated urethane-containing adduct comprises an isocyanate-terminated urethane-containing polythioether, an isocyanate-terminated urethane-containing polysulfide, an isocyanate-terminated urethane-containing sulfur-containing polyformal, or a combination of any of the foregoing.

5. The prepolymer of claim 1, wherein the compound comprises an aminosilane.

6. The prepolymer of claim 5, wherein the aminosilane comprises 3-aminopropylsilane.

7. A moisture-curable urethane-containing prepolymer comprising a moisture-curable urethane-containing prepolymer of Formula (6a), a moisture-curable urethane-containing prepolymer of Formula (6b), or a combination thereof:

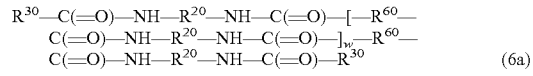  (6a)

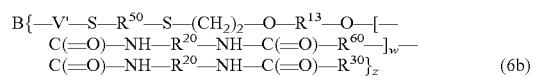  (6b)

wherein,
w is an integer from 1 to 100;
each $R^{13}$ independently comprises $C_{2-10}$ alkanediyl;
each $R^{20}$ independently comprises a core of a diisocyanate;
each $R^{30}$ independently is a moiety comprising a terminal polyalkoxysilyl group;
each $R^{50}$ independently comprises a backbone of a sulfur-containing prepolymer, wherein the sulfur-containing prepolymer comprises a polythioether, a polysulfide, a sulfur-containing polyformal, or a combination of any of the foregoing;
each $R^{60}$ independently comprises a moiety having the structure of Formula (7):

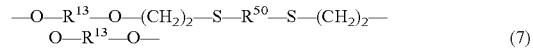  (7)

B represents a core of a z-valent, polyfunctionalizing agent $B(—V)_z$ wherein,
z is an integer from 3 to 6; and
each V is a moiety comprising a terminal group reactive with a thiol group; and
each —V'— is derived from the reaction of —V with a thiol.

8. The prepolymer of claim 7, wherein each $R^{30}$ independently comprises a moiety of Formula (8a) or a moiety of Formula (8b):

$$-NH(-R^9-Si(-R^7)_p(-OR^7)_{3-p}) \quad (8a)$$

$$-N(-R^9-Si(-R^7)_p(-OR^7)_{3-p})_2 \quad (8b)$$

wherein,
p is selected from 0, 1, and 2;
each $R^7$ is independently selected from $C_{1-4}$ alkyl; and
each $R^9$ is independently $C_{1-6}$ alkanediyl.

9. The prepolymer of claim 7, wherein each $R^{50}$ comprises a backbone of Formula (9):

$$-R^1-[-S-(CH_2)_p-O-(R^2-O)_m-(CH_2)_2-S-R^1-]_n- \quad (9)$$

wherein,
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(-CHR^3-)_s-X-]_q-(-CHR^3-)_r-$, wherein:
s is an integer from 2 to 6;
q is an integer from 1 to 5;
r is an integer from 2 to 10;
each $R^3$ is independently selected from hydrogen and methyl; and
each X is independently selected from $-O-$, $-S-$, and $-NR-$, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $-[(-CHR^3-)_s-X-]_q-(-CHR^3-)_r-$, wherein s, q, r, $R^3$, and X are as defined as for $R^1$;
m is an integer from 0 to 50;
n is an integer from 1 to 60;
p is an integer from 2 to 6;
each $R^{13}$ is $C_{2-4}$ alkanediyl; and
each $R^{20}$ is a core of a diisocyanate.

10. The prepolymer of claim 7, wherein $R^{30}$ has the structure of Formula (8c):

$$-NH-(CH_2)_3-Si(-OCH_3)_3 \quad (8c).$$

11. A composition comprising:
the prepolymer of claim 1; and
a moisture cure catalyst.

12. The composition of claim 11, comprising dimethoxy(methyl)(vinyl)silane.

13. The composition of claim 11, formulated as a sealant.

14. A cured sealant prepared from the composition of claim 13.

15. A composition comprising:
the prepolymer of claim 7; and
a moisture cure catalyst.

16. The composition of claim 15, comprising dimethoxy(methyl)(vinyl)silane.

17. The composition of claim 15, formulated as a sealant.

18. A cured sealant prepared from the composition of claim 17.

19. A method of synthesizing a moisture-curable urethane-containing prepolymer, comprising:
reacting a thiol-terminated sulfur-containing prepolymer with a hydroxy vinyl ether to provide a hydroxy-terminated sulfur-containing adduct, wherein the thiol-terminated sulfur-containing prepolymer comprises a thiol-terminated polythioether, a thiol-terminated polysulfide, a thiol-terminated sulfur-containing polyformal, or a combination of any of the foregoing;
reacting the hydroxy-terminated sulfur-containing adduct with a diisocyanate to provide an isocyanate-terminated sulfur-containing adduct; and
reacting the isocyanate-terminated sulfur-containing adduct with a compound comprising a group reactive with an isocyanate and at least one terminal polyalkoxysilyl group to provide the moisture-curable urethane-containing prepolymer.

* * * * *